July 8, 1924.
M. A. VILLIAMO
CATCHUP MAKING MACHINE
Filed Nov. 15, 1923
1,500,690
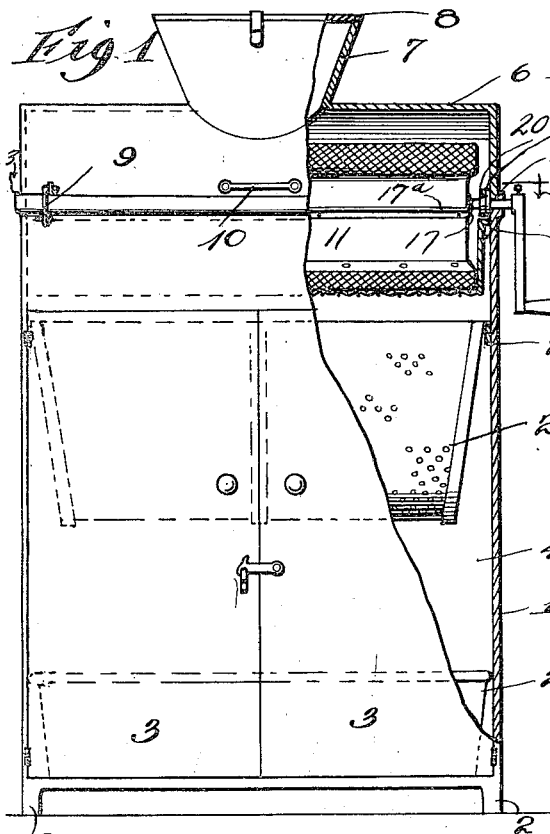
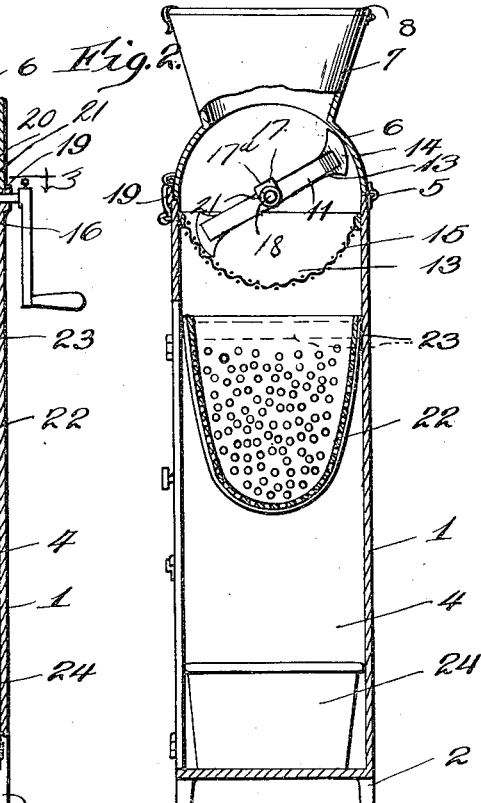
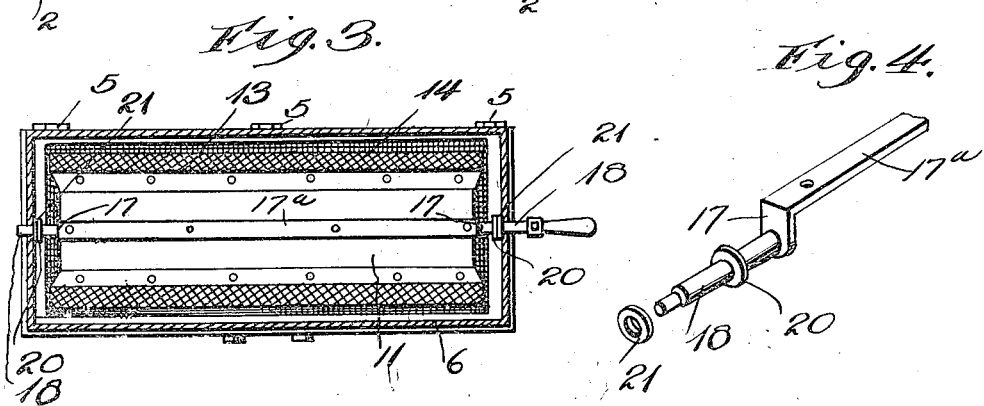
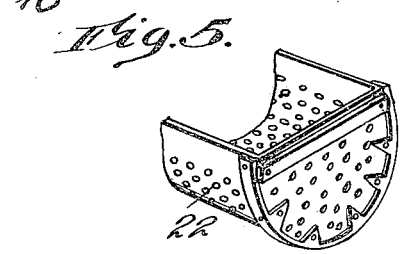
Inventor
Mark A. Villiamo
By D. Swift
Attorney Patented July 8, 1924.

1,500,690

UNITED STATES PATENT OFFICE.

MARK A. VILLIAMO, OF NEW CASTLE, PENNSYLVANIA.

CATCHUP-MAKING MACHINE.

Application filed November 15, 1923. Serial No. 674,867.

*To all whom it may concern:*

Be it known that I, MARK A. VILLIAMO, a citizen of the United States, residing at New Castle, in the county of Lawrence, State of Pennsylvania, have invented a new and useful Catchup-Making Machine; and I do hereby declare the following to be a full, clear, and exact description of the invention, such as will enable others skilled in the art to which it appertains to make and use the same.

The invention relates to catchup making machines and has for its object to provide a device of this character, which is simple in construction, compact and formed from a minimum amount of parts thereby allowing the device to be cheaply sold for household use.

A further object is to provide a catchup making machine comprising a casing having a pivoted convexed cover, a removable semicircular screen disposed within the upper end of the cover and into which tomatoes are passed through a hopper carried by the cover. Also to rotatably and detachably mount within the screen a crushing and grinding element for crushing and grinding tomatoes within the screen and forcing the same through the screen into a perforated removable sieve disposed above a removable water receiving pan.

A further object is to provide the front of the casing with doors, which when opened allow the removal of the sieve and water receiving pan.

A further object is to form the crushing member from a body member, preferably formed of wood and having equally spaced flanges, the edges of which are provided with channeled metallic members, preferably roughened on their outer sides, which members prevent wearing of the spaced wooden flanges.

A further object is to provide brackets at the ends of the rotatable member, which brackets are provided with pintles, adapted to be received in bearings in the upper end of the casing; also to provide washer means carried by the pintles for preventing material from being forced through the pintle bearings, said brackets being connected together by a bar.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front elevation of the device, part being broken away to better show show the structure.

Figure 2 is a vertical transverse sectional view through the device.

Figure 3 is a horizontal sectional view taken on line 3—3 of Figure 1.

Figure 4 is a perspective view of one of the pintles and its supporting bracket and a portion of the bar.

Figure 5 is a detail perspective view of one end of the sieve.

Referring to the drawing, the numeral 1 designates a rectangular shaped casing, which casing is supported on legs 2. Hingedly connected to the forward side of the casing 1 are doors 3, whereby access to the chamber 4 of the casing may be had. Hingedly connected at 5 to the upper end of the casing 1 is a cover 6, which cover is preferably segmentally shaped in vertical transverse cross section, and is provided with a hopper 7, into which hopper tomatoes may be placed during a catchup making operation. The hopper 7 is preferably provided with a cover 8, which may be closed during a tomato crushing operation, for preventing portions of the tomatoes from being forced through the hopper. Cover 6 is held closed during the tomato crushing operation by means of hooks 9, and is provided with a handle 10 adapted to be grasped by the operator for raising the cover when access is desired to the upper end of the chamber 9.

Disposed within the upper end of the chamber 4 and within the chamber of the cover 6 is a crushing member 11, which member is formed from wood and has its flanges 12 oppositely disposed. The edges of the flanges 12 are protected against splintering and wear by longitudinally disposed channeled members 13, preferably formed from aluminum, and which channeled members prevent wear of the wood of the flanges 12, incident to a tomato crushing operation. Channeled members 13 have their outer sides convexed and curved inwardly from one side thereof, and preferably roughened as shown at 14, thereby insuring a positive grinding operation and the forcing of the tomatoes in ground and crushed condition through the removable screen 15, which screen is supported on strips 16 at the opposite sides of the casing 1. Secured to the ends of the crushing member 11 are brackets 17, which brackets are provided with pintles 18 adapted to be received in semicircular bearings 19 of the casing 1 and the cover 6, therefore it will be seen that the crushing member 11 is removably mounted, so that it may be easily removed for cleaning or repair purposes. Brackets 17 are connected together by an integral bar 17ᵃ which is secured to the crushing member 11. To prevent liquid or ground tomatoes from being forced through the bearings 19, the pintles 18 are provided with shoulders 20, and between which shoulder and the inner wall of the cover 6 and casing 1, rubber washers 21 are interposed, which washers prevent the ground tomatoes or water therefrom from entering the bearings 19.

Removably supported within the casing 1 below the screen 15 is a sieve 22, the ends of which are supported on strips 23, in a position where it may be easily removed from the casing 1, when the doors 3 are open. Sieve 22 is preferably formed from sheet metal and is longitudinally and transversely narrower at its lower end than at its upper end, so that crushed tomatoes which collect therein will drain in a manner whereby when the water is drained therefrom, it will drop into the water pan 24 disposed in the lower end of the chamber 4, which water pan is proportioned whereby it may be easily moved from the casing 1 when the doors 3 are opened. After the crushing and draining operation the sieve 22 is removed from the machine and the contents thereof bottled in the usual manner.

From the above it will be seen that a catchup making machine is provided, which machine is simple in construction, may be cheaply manufactured, thereby allowing the device to be sold as a household article. It will also be seen that the crushing member 11 and the sieves may be easily and quickly removed for cleaning purposes and tomatoes may be easily and quickly ground and strained for making catchup.

The invention having been set forth what is claimed as new and useful is:—

1. A catchup making machine comprising a casing, a semicircular shaped cover hingedly connected to the upper end of said casing, a semicircular shaped screen detachably supported in the upper end of the casing and in connection with the cover forming a cylindrically shaped chamber, a rotatable crushing member disposed within the cylindrical chamber, the ends of said crushing member being provided with pintles having bearings in registering semicircular recesses in the cover and casing, a sieve detachably supported within the casing below the screen, a receptacle disposed within the casing below the sieve, doors carried by said casing, said doors forming means whereby access may be had to the casing and the sieve and the receptacle removed therefrom.

2. A catchup making machine comprising a casing, a hinged cover carried by the upper end of said casing, a hopper carried by said cover, a cover for said hopper, a screen detachably supported within the casing, a crushing member rotatably mounted between the screen and cover, a sieve disposed below the screen, a handle member carried by the rotatable crushing member, a receptacle disposed within the casing below the sieve, said sieve and receptacle being removable from the casing through the side thereof.

In testimony whereof I have signed my name to this specification in the presence of two subscribing witnesses.

MARK A. VILLIAMO.

Witnesses:
   J. DAVIS,
   G. R. RYAN.